US012641561B2

(12) United States Patent

Seok et al.

(10) Patent No.: US 12,641,561 B2

(45) Date of Patent: May 26, 2026

(54) EHT ERROR RECOVERY IN SYNCHRONOUS MULTIPLE-FRAME TRANSMISSION IN WIRELESS COMMUNICATIONS

(71) Applicant: MediaTek Singapore Pte. Ltd., Singapore (SG)

(72) Inventors: Yongho Seok, San Jose, CA (US); Kai Ying Lu, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 224 days.

(21) Appl. No.: 18/648,341

(22) Filed: Apr. 27, 2024

(65) Prior Publication Data

US 2024/0314713 A1 Sep. 19, 2024

Related U.S. Application Data

(63) Continuation of application No. 17/400,108, filed on Aug. 11, 2021, now Pat. No. 11,997,631.

(60) Provisional application No. 63/115,092, filed on Nov. 18, 2020, provisional application No. 63/066,359, filed on Aug. 17, 2020.

(51) Int. Cl.
| | |
|---|---|
| *H04W 56/00* | (2009.01) |
| *H04L 5/14* | (2006.01) |
| *H04W 72/541* | (2023.01) |
| *H04W 76/15* | (2018.01) |

(52) U.S. Cl.
CPC .......... *H04W 56/0045* (2013.01); *H04L 5/14* (2013.01); *H04W 56/006* (2013.01); *H04W 72/541* (2023.01); *H04W 76/15* (2018.02)

(58) Field of Classification Search
CPC ........... H04W 56/0045; H04W 56/006; H04W 72/541; H04W 76/15; H04L 5/14; H04L 1/188; H04L 1/1887; H04L 43/0823; H04L 41/0654; H04L 43/0847
See application file for complete search history.

(56) References Cited

U.S. PATENT DOCUMENTS

| | | | |
|---|---|---|---|
| 10,153,857 B1 | 12/2018 | Chu et al. | |
| 2021/0211375 A1* | 7/2021 | Kwon | ................ H04W 72/535 |
| 2021/0337564 A1* | 10/2021 | Kwon | .............. H04W 72/0446 |

OTHER PUBLICATIONS

European Patent Office, Communication pursuant to Article 94(3) EPC in EP Application No. 21191217.5, Jul. 18, 2025.

* cited by examiner

*Primary Examiner* — Yaotang Wang

(74) *Attorney, Agent, or Firm* — Andy M. Han; Han IP PLLC

(57) ABSTRACT

Various examples pertaining to extremely-high-throughput (EHT) error recovery in synchronous multiple-frame transmission in wireless communications are described. A multi-link device (MLD) detects a failure related to either or both of a first frame exchange sequence on a first link or a second frame exchange sequence on a second link. In response to the detecting, the MLD adjusts a timing of either or both of a first subsequent transmission on the first link and a second subsequent transmission on the second link to align the first and second subsequent transmissions.

5 Claims, 15 Drawing Sheets

Figure 14:
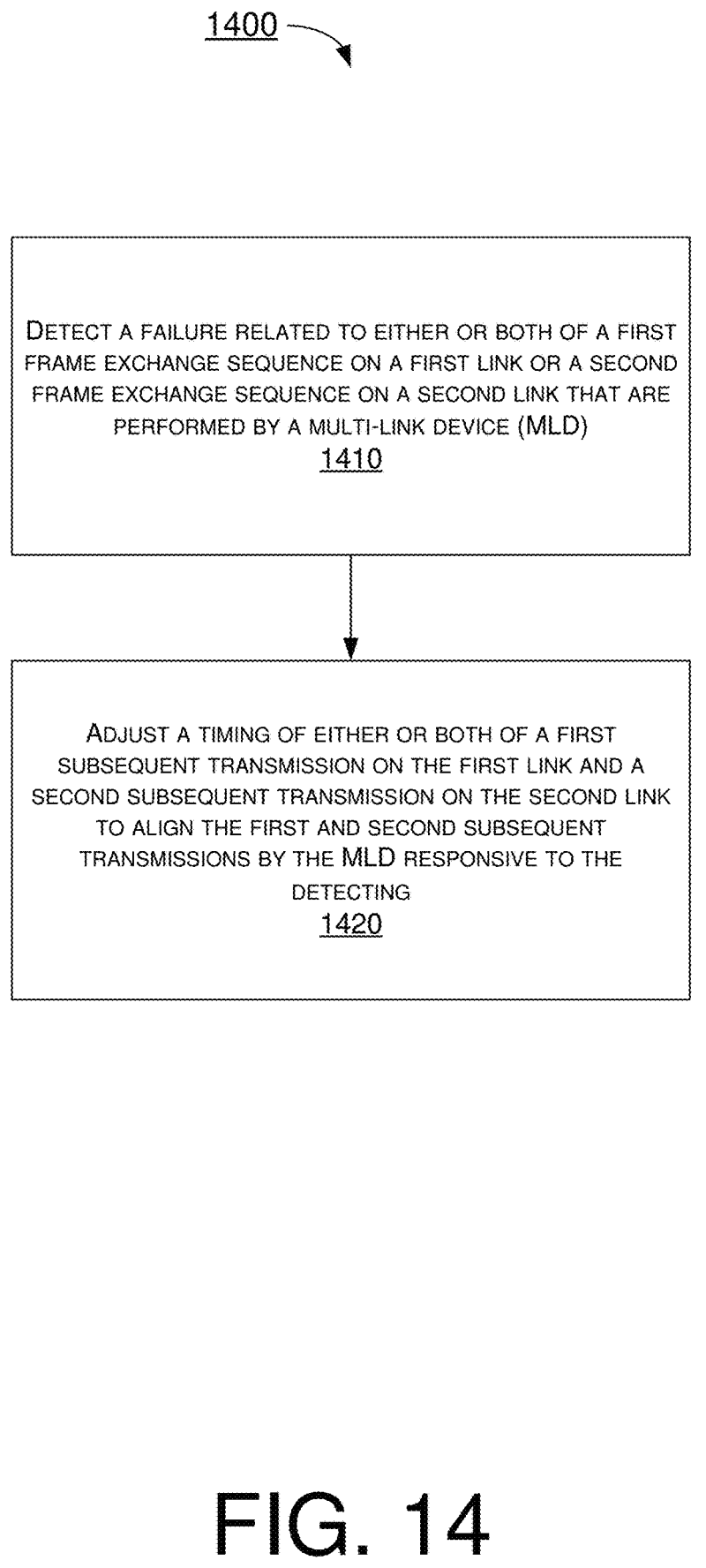

1400

DETECT A FAILURE RELATED TO EITHER OR BOTH OF A FIRST FRAME EXCHANGE SEQUENCE ON A FIRST LINK OR A SECOND FRAME EXCHANGE SEQUENCE ON A SECOND LINK THAT ARE PERFORMED BY A MULTI-LINK DEVICE (MLD)
1410

ADJUST A TIMING OF EITHER OR BOTH OF A FIRST SUBSEQUENT TRANSMISSION ON THE FIRST LINK AND A SECOND SUBSEQUENT TRANSMISSION ON THE SECOND LINK TO ALIGN THE FIRST AND SECOND SUBSEQUENT TRANSMISSIONS BY THE MLD RESPONSIVE TO THE DETECTING
1420

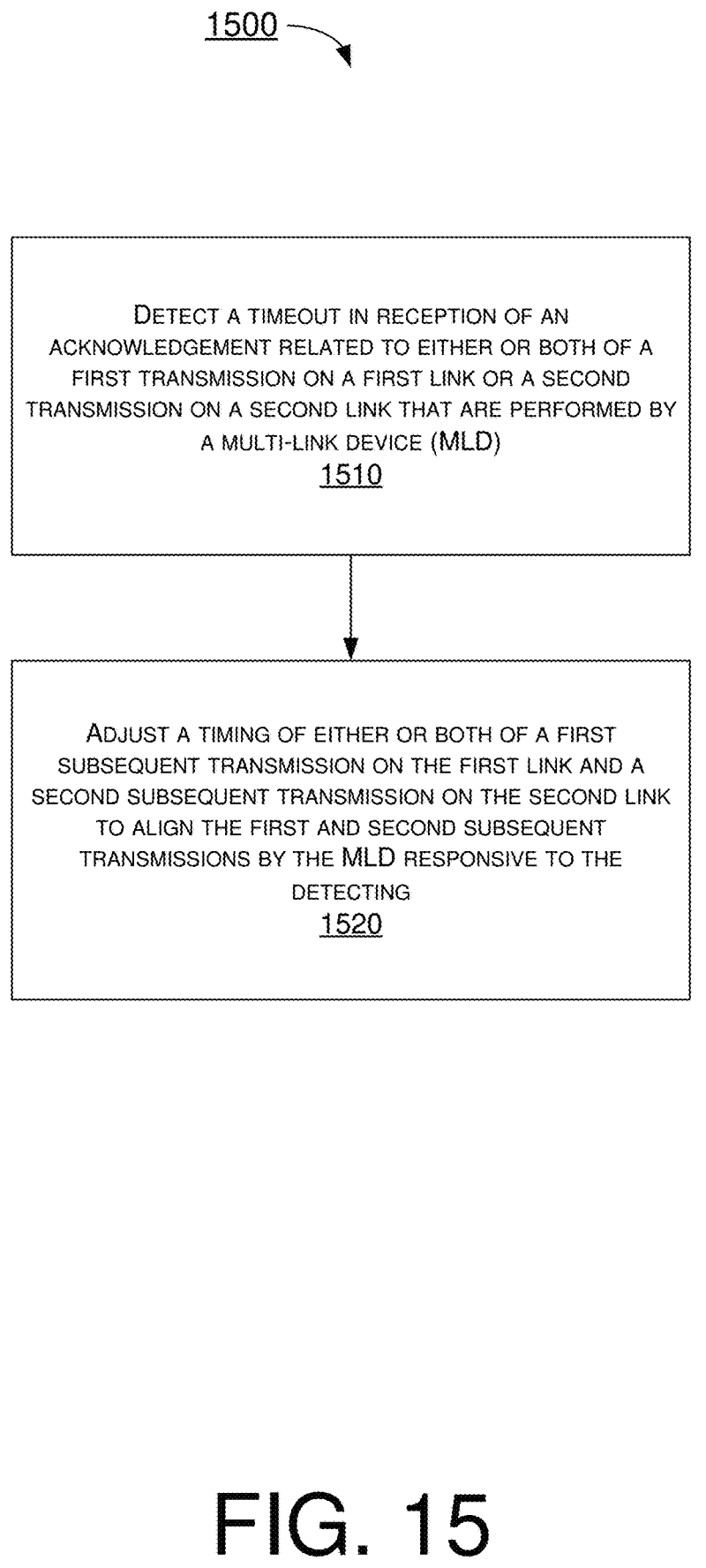

DETECT A TIMEOUT IN RECEPTION OF AN
ACKNOWLEDGEMENT RELATED TO EITHER OR BOTH OF A
FIRST TRANSMISSION ON A FIRST LINK OR A SECOND
TRANSMISSION ON A SECOND LINK THAT ARE PERFORMED BY
A MULTI-LINK DEVICE (MLD)
1510

ADJUST A TIMING OF EITHER OR BOTH OF A FIRST
SUBSEQUENT TRANSMISSION ON THE FIRST LINK AND A
SECOND SUBSEQUENT TRANSMISSION ON THE SECOND LINK
TO ALIGN THE FIRST AND SECOND SUBSEQUENT
TRANSMISSIONS BY THE MLD RESPONSIVE TO THE
DETECTING
1520

FIG. 15

EHT ERROR RECOVERY IN SYNCHRONOUS MULTIPLE-FRAME TRANSMISSION IN WIRELESS COMMUNICATIONS

CROSS REFERENCE TO RELATED PATENT APPLICATIONS

The present disclosure is part of a continuation of U.S. patent application Ser. No. 17/400,108, filed 11 Aug. 2021 and claiming the priority benefit of U.S. Provisional Patent Application Nos. 63/066,359 and 63/115,092, filed 17 Aug. 2020 and 18 Nov. 2020, respectively. Contents of aforementioned applications are herein incorporated by reference in their entirety.

TECHNICAL FIELD

The present disclosure is generally related to wireless communications and, more particularly, to extremely-high-throughput (EHT) error recovery in synchronous multiple-frame transmission in wireless communications.

BACKGROUND

Unless otherwise indicated herein, approaches described in this section are not prior art to the claims listed below and are not admitted as prior art by inclusion in this section.

In a wireless local area network (WLAN) according to the Institute of Electrical and Electronics Engineers (IEEE) 802.11 Specifications, a multi-link device (MLD) refers to a device that has more than one affiliated station (STA) and has one medium access control (MAC) service access point (SAP) to logic link control (LLC) layer, which includes one MAC data service. Each of the multiple STAs affiliated with an MLD operates independently and follows a baseline enhanced distributed channel access (EDCA) procedure. The MLD can have two types of queues, namely an MLD queue and a STA queue. Regarding the MLD queue, before a transmitter among the STAs affiliated with the MLD is determined, the MLD buffers the MAC protocol data units (MPDUs) to the MLD queue. The STA queue includes transmit queues for each access category (AC). After a transmitter among the STAs affiliated with the MLD is determined, the MLD buffers the MPDUs to the STA queue associated with one of the STAs that is determined to be the transmitter. For synchronous multi-link operations by STAs affiliated with an MLD in EHT wireless communications based on IEEE 802.11be and beyond, however, there remain certain issues that need to be addressed, including error recovery in synchronous multiple-frame transmission. Therefore, there is a need for a solution of EHT error recovery in synchronous multiple-frame transmission.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EHT error recovery in synchronous multiple-frame transmission in wireless communications. Under various proposed schemes in accordance with the present disclosure, issues described herein may be addressed.

In one aspect, a method may involve detecting a failure related to either or both of a first frame exchange sequence on a first link or a second frame exchange sequence on a second link that are performed by a MLD. The method may also involve adjusting a timing of either or both of a first subsequent transmission on the first link and a second subsequent transmission on the second link to align the first and second subsequent transmissions by the MLD responsive to the detecting.

In another aspect, a method may involve detecting a timeout in reception of an acknowledgement related to either or both of a first transmission on a first link or a second transmission on a second link that are performed by a MLD. The method may also involve adjusting a timing of either or both of a first subsequent transmission on the first link and a second subsequent transmission on the second link to align the first and second subsequent transmissions by the MLD responsive to the detecting.

In yet another aspect, an apparatus may include a transceiver configured to communicate wirelessly and a processor coupled to the transceiver. The processor may detect, via the transceiver, a condition related to either or both of a first transmission on a first link or a second transmission on a second link. The processor may also adjust a timing of either or both of a first subsequent transmission on the first link and a second subsequent transmission on the second link to align the first and second subsequent transmissions responsive to the detecting.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 14 is a flowchart of an example process in accordance with an implementation of the present disclosure.

FIG. 15 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EHT error recovery in synchronous multiple-frame transmission in wireless communications. According to the present disclosure, a number of possible solutions may be implemented separately or jointly. That is, although these possible solutions may be described below separately, two or more of these possible solutions may be implemented in one combination or another.

Figure 1:
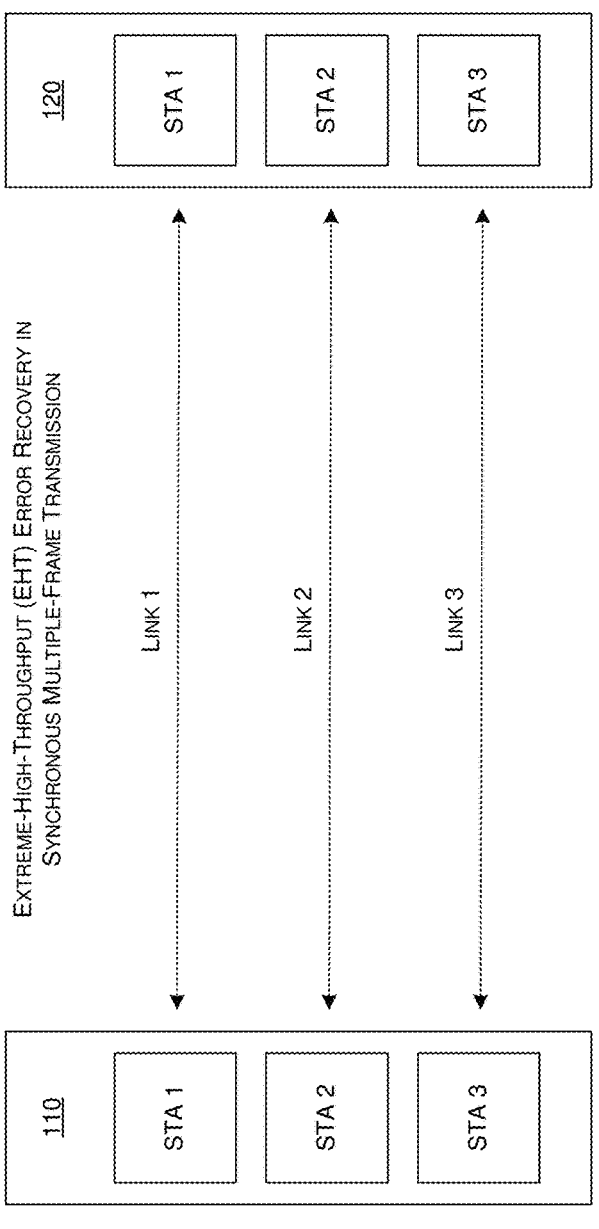
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 15 illustrate examples of implementation of various proposed schemes in network environment 100 in accordance with the present disclosure. The following description of various proposed schemes is provided with reference to FIG. 1~FIG. 15.

Referring to FIG. 1, network environment 100 may involve a communication entity 110 and a communication entity 120 communicating wirelessly over multiple links (e.g., link 1, link 2 and link 3) in accordance with one or more IEEE 802.11 standards such as IEEE 802.11be and beyond. Each of communication entity 110 and communication entity 120 may function as an MLD. For instance, communication entity 110 may have multiple virtual STAs (e.g., STA 1, STA 2 and STA 3) operating therewithin and each functioning as either an access point (AP) STA or a non-AP STA. Correspondingly, communication entity 120 may have multiple virtual STAs (e.g., STA 1, STA 2 and STA 3) operating therewithin and each functioning as either an AP STA or a non-AP STA. Moreover, either or both of communication entity 110 and communication entity 120 may be a non-simultaneous-transmission-and-reception (non-STR) MLD which cannot simultaneously transmit on one link and receive on another link due to in-device coexistence (IDC) interference. Under various proposed schemes in accordance with the present disclosure, communication entity 110 and communication entity 120 may be configured to perform EHT error recovery in synchronous multiple-frame transmission in wireless communications according to various proposed schemes described herein.

In general, in a synchronous multi-link high MAC procedure, a MLD checks a random backoff (RBO) counter of each STA affiliated with the MLD. If the RBO counter of a STA is equal to 0, the MLD may pass a MPDU from the MLD queue to the corresponding STA queue and the STA may initiate a transmission opportunity (TXOP). In this case, synchronous multi-link transmission does not occur. However, when the RBO counter of a first STA (STA1) is equal to 0, the MLD may decide to not pass the MPDU from the MLD queue to the STA queue of STA1 in case the RBO counter of a second STA (STA2) almost reaches 0. Consequently, STA1 does not initiate a TXOP and STA2 continues a backoff procedure. Next, when the RBO counter of STA2 is equal to 0, the MLD may pass the MPDU from the MLD queue to the STA queue of STA2 as well as the STA queue of STA1. Both STA2 and STA1 may initiate a TXOP simultaneously. In such case, STA1 does not invoke a new backoff procedure if the medium is not busy according to the baseline rule. That is, a backoff procedure is to be invoked by an enhanced distributed channel access function (ED-CAF) when any of a list of events occurs, including an event in which an MA-UNITDATA.request primitive is received that causes a frame with that AC to be queued for transmission such that one of the transmit queues associated with that AC has now become non-empty and any other transmit queues associated with that AC are empty. The medium is busy on the primary channel as indicated by any of physical carrier sensing (CS), virtual CS and/or a non-zero transmit network allocation vector (TXNAV) timer value. Thus, if one of the transmit queues has now become non-empty while the medium is idle, the backoff procedure would not be necessary. However, if the medium of STA1 is busy, then only STA2 would initiate a TXOP. In such case, STA1 may invoke a new backoff procedure when the medium is changed to idle according to the baseline rule. Nevertheless, STA1 may dequeue the MPDU from its STA queue for retrying the synchronous multi-link transmission. Accordingly, synchronous multi-link transmission can be supported without any modification to the current backoff procedure. This may be achieved by an implementation-specific scheduler that passes the MPDU from the MLD queue to a STA queue based on the RBO counters of STAs affiliated with the MLD.

In the following description of various scenarios under proposed schemes in accordance with the present disclosure, the STAs affiliated with an MLD (e.g., STA1 and STA2) may perform (or attempt to perform) synchronous multiple-frame transmission of one or more aggregate MAC-level protocol data units (A-MPDUs) each followed by a respective block acknowledgement (BA) frame. In FIG. 2~FIG. 12, each transmitted A-MPDU is denoted as "TX A-MPUD" and each received BA frame is denoted as "Rx BA". Moreover, in some of the scenarios depicted among FIG. 2~FIG. 12, when an error or failure in the transmission is detected as indicated in a BA frame (e.g., CRC fail of the BA frame), the BA frame indicating occurrence of the error/failure is denoted as "Rx BA (error)".

Figure 2:
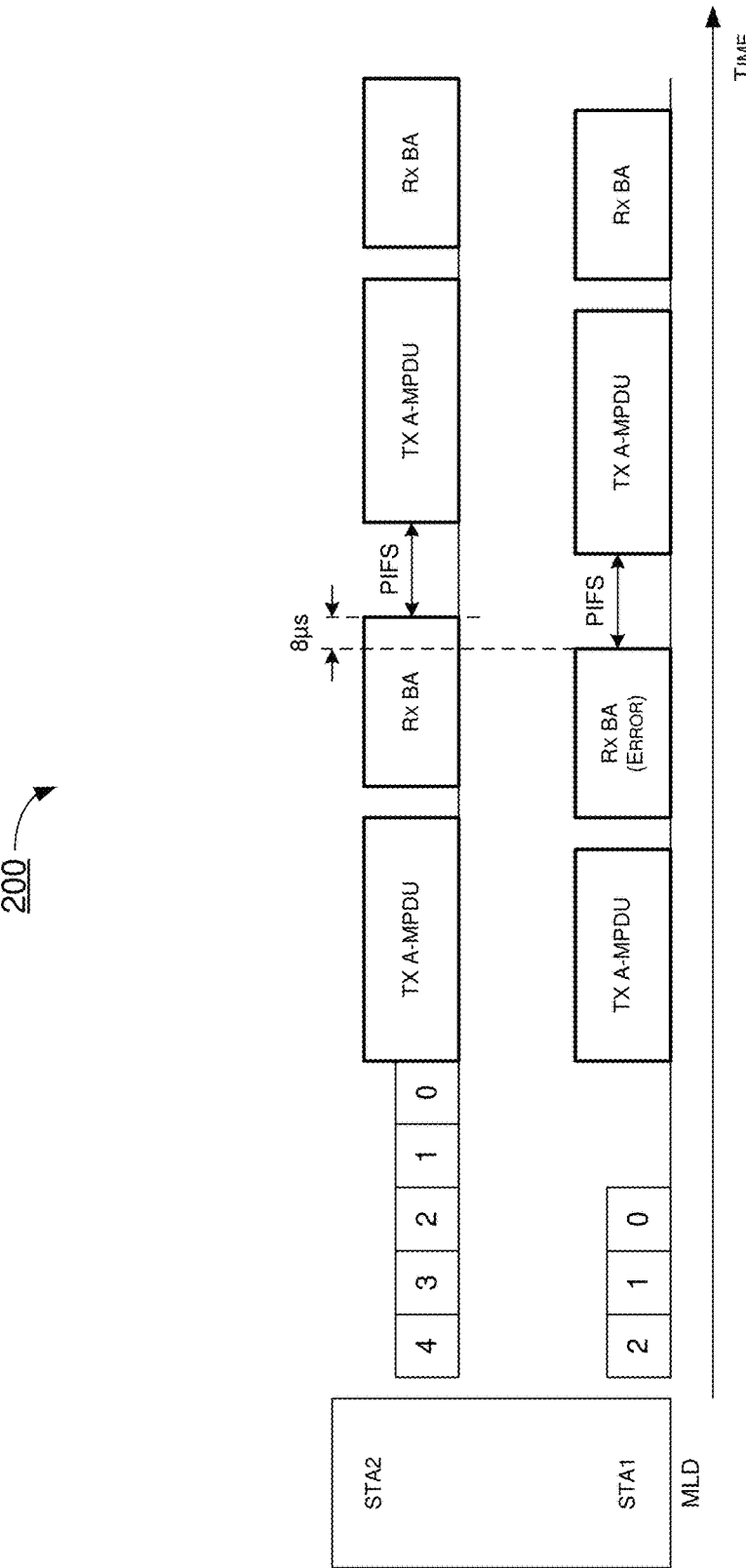
FIG. 2 is a diagram of an example scenario in accordance with an implementation of the present disclosure.

FIG. 2 illustrates an example scenario 200 with respect to error recovery in synchronous multiple-frame transmission under a proposed scheme in accordance with the present disclosure. Referring to FIG. 2, during a TXOP, when a STA (e.g., STA1) in an MLD (e.g., communication entity 110) fails a transmission, STA1 may perform a point coordination function (PCF) inter-frame space (PIFS) recovery procedure. Moreover, as shown in FIG. 2, as STA1 performs the PIFS recovery procedure, another STA (e.g., STA2) in the same MLD with a successful transmission may commence transmission of a frame a PIFS after the completion of the immediately preceding frame exchange sequence, subject to its TXOP limit. After a valid response to an initial frame of a TXOP and in case the Duration/ID filed is set for multiple-frame transmission and there is a subsequent transmission failure, then the corresponding channel access function may transmit after the CS mechanism indicates that the medium is idle at the TxPIFS slot boundary, provided that the duration of that transmission plus the duration of any expected acknowledgement (ACK) and applicable inter-frame space (IFS) is less than the remaining TXNAV timer value.

Figure 3:
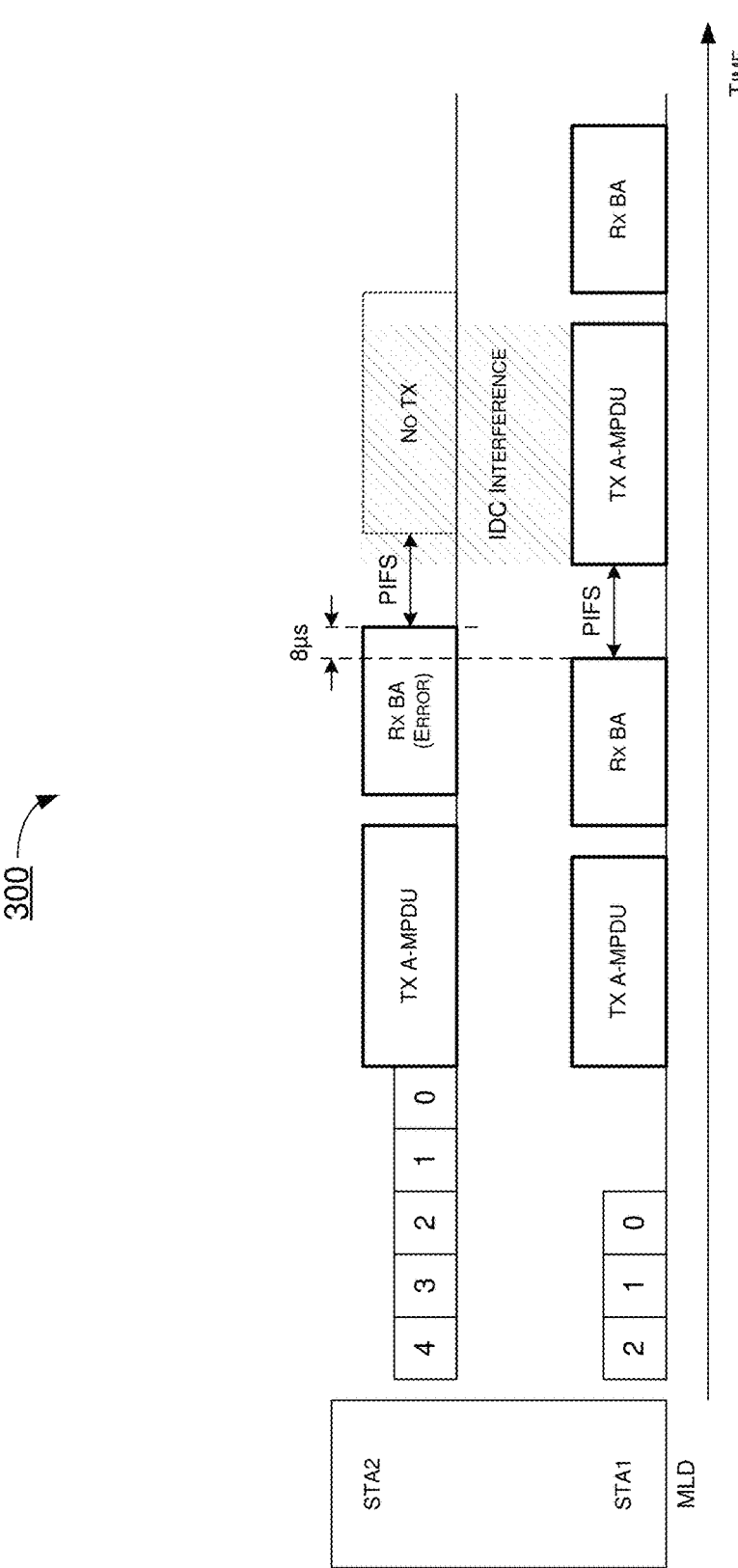
FIG. 3 is a diagram of an example scenario in accordance with an implementation of the present disclosure.

FIG. 3 illustrates an example scenario 300 with respect to error recovery in synchronous multiple-frame transmission under the proposed scheme. Referring to FIG. 3, in an event that an MLD is a non-STR MLD, when a transmission failure is recognized from a lastly arrived BA frame, the CS mechanism may indicate that the medium is busy at the TxPIFS slot boundary because of the IDC interference caused by another STA in the same MLD. In such case the error cannot be recovered.

Figure 4:
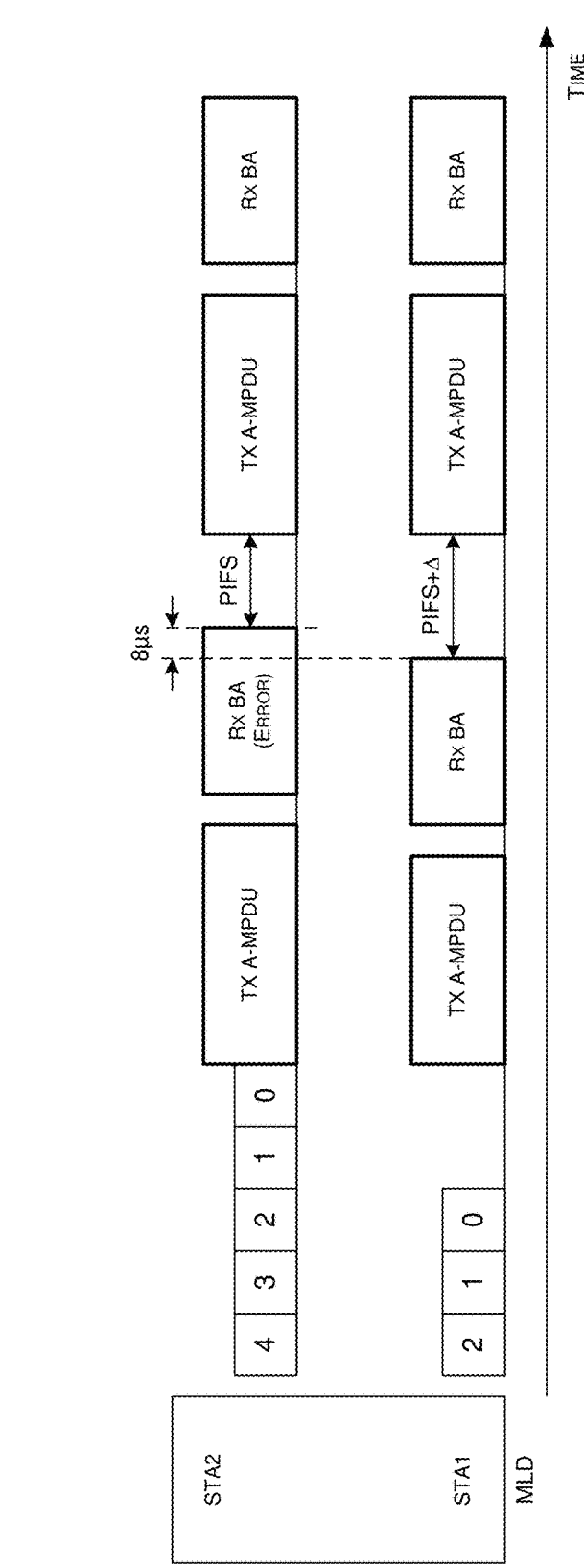
FIG. 4 is a diagram of an example scenario in accordance with an implementation of the present disclosure.

FIG. 4 illustrates an example scenario 400 with respect to error recovery in synchronous multiple-frame transmission under the proposed scheme. Referring to FIG. 4, in a first option (Option 1) under the proposed scheme, an inter-frame space for STA1 may be increased to PIFS+Δ, with Δ being 8 microseconds (8 μs)—a reception-to-transmission turn-around time (aRxTxTurnaroundTime). Here, 8 μs is the maximum value of a difference between ending times of different BA frames. However, in Option 1, probability of collision may be also increased as other overlapping basic service set (OBSS) STA(s) may access the medium after an arbitrary inter-frame space (AIFS).

Figure 5:
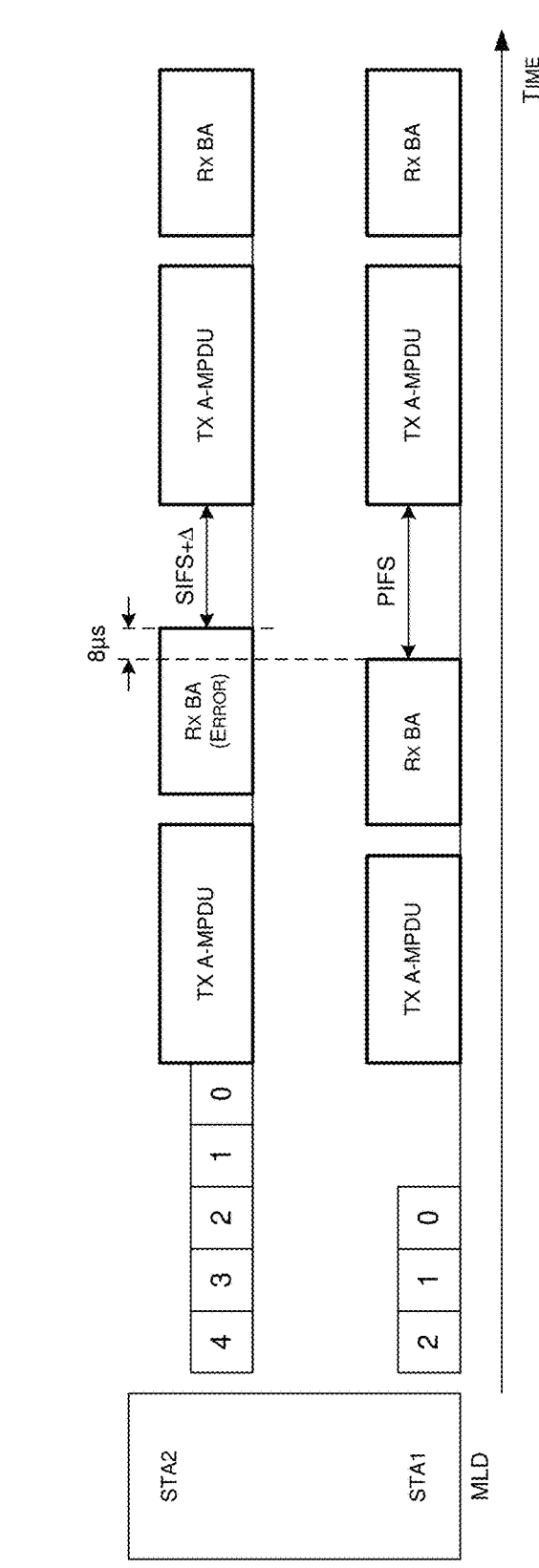
FIG. 5 is a diagram of an example scenario in accordance with an implementation of the present disclosure.

FIG. 5 illustrates an example scenario 500 with respect to error recovery in synchronous multiple-frame transmission under the proposed scheme. Referring to FIG. 5, in a second option (Option 2) under the proposed scheme, similar to a triggered uplink access (TUA), the clear channel assessment (CCA) of a STA for error recovery may be performed within a short inter-frame space (SIFS) instead of a PIFS. Under the proposed scheme, the inter-frame space may be determined between the SIFS and the SIFS+Δ that can align the starting times of frame transmission by multiple STAs, with A being between 0 μs and aSlotTime. Thus, the maximum inter-frame space (e.g., SIFS+Δ) may be limited to the PIFS. Under the proposed scheme, the adjusted inter-frame space may be between SIFS and PIFS (or mathematically denoted as [SIFS, PIFS]). In some implementations, the adjusted inter-frame space may be greater than or equal to PIFS−4 μs and less than or equal to PIFS (or mathematically denoted as [PIFS−4 μs, PIFS]).

Figure 6:
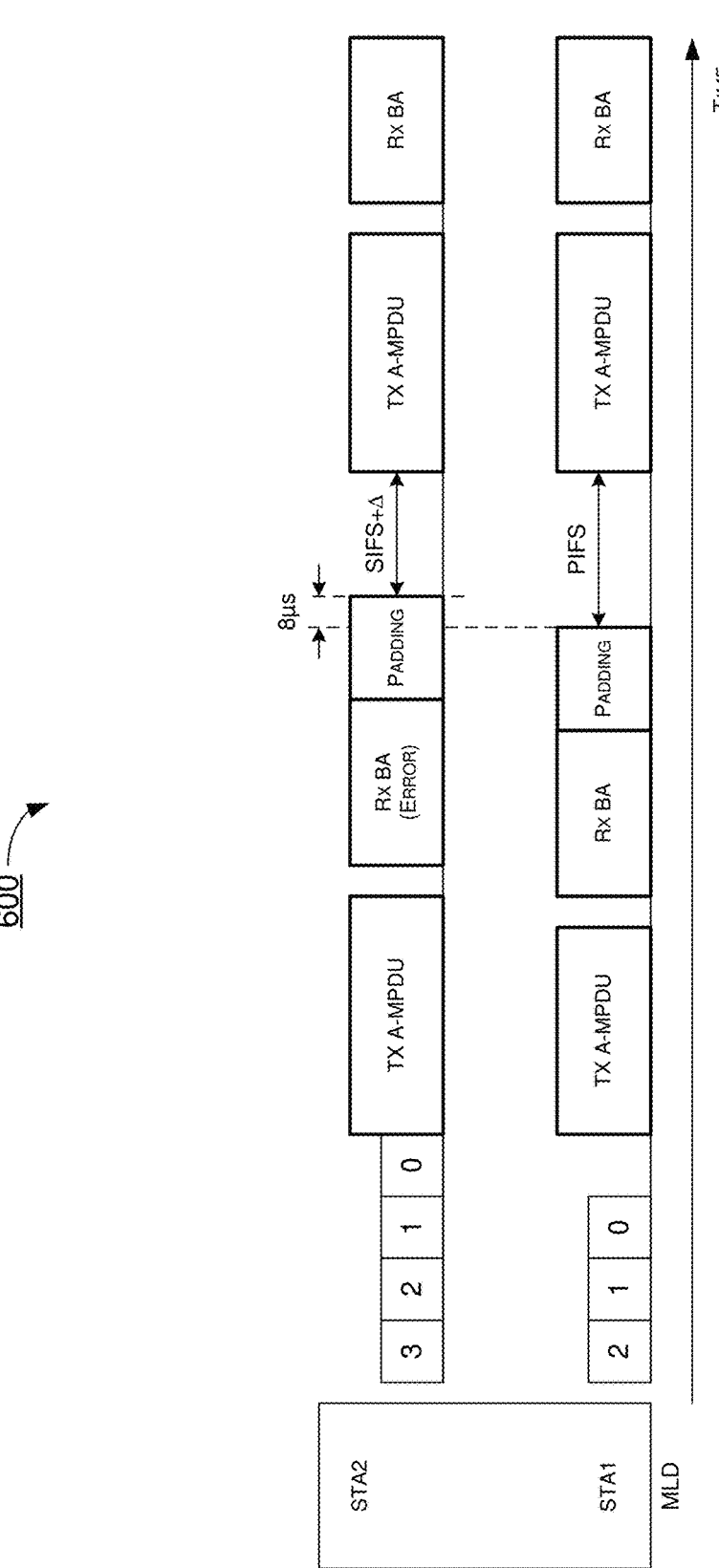
FIG. 6 is a diagram of an example scenario in accordance with an implementation of the present disclosure.

In Option 2, in order to perform the CCA during the SIFS, the STA may need more processing time. Accordingly, the MLD may indicate a Control Response Frame Padding Duration to a peer MLD. When the peer MLD transmits a control response frame, the peer MLD may include the MAC (end of frame (EOF)) and/or physical-layer (PHY) packet extension (PE) padding to mee the Control Response Frame Padding Duration. FIG. 6 illustrates an example scenario 600 with respect to error recovery in synchronous multiple-frame transmission under the proposed scheme.

Figure 7:
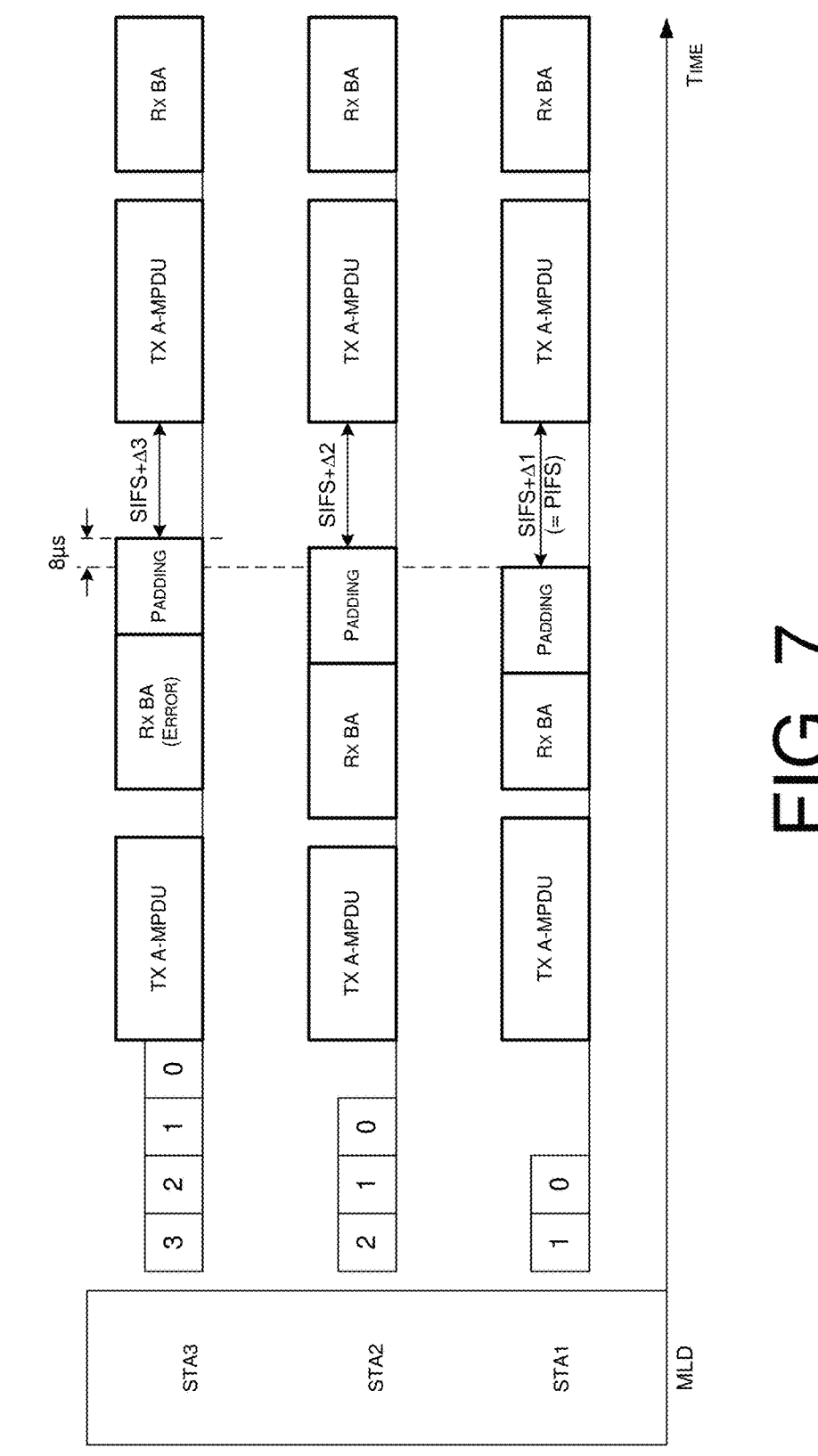
FIG. 7 is a diagram of an example scenario in accordance with an implementation of the present disclosure.

FIG. 7 illustrates an example scenario 700 with respect to error recovery in synchronous multiple-frame transmission under the proposed scheme. Referring to FIG. 7, Option 2 may be generalized. During a TXOP, a STA in the MLD that either succeeds or fails in a transmission may commence transmission of a frame at SIFS+Δi (i=1, 2, 3 . . . ) after the completion of an immediately preceding frame exchange sequence, with Δi being between 0 μs and aSlotTime. In scenario 700, STA1 may commence transmission of a next frame at SIFS+Δ1 after the completion of a respective immediately preceding frame exchange sequence, STA2 may commence transmission of a next frame at SIFS+Δ2 after the completion of a respective immediately preceding frame exchange sequence, and STA3 may commence transmission of a next frame at SIFS+Δ3 after the completion of a respective immediately preceding frame exchange sequence. In this example, Δ1, Δ2 and Δ3 may or may not be different from each other, so long as STA1, STA2 and STA3 all commence transmitting their next frames synchronously (at the same time; in some implementations a time difference within +/−4 μs (aRxTxTurnaroundTime) is also acceptable as the same timing) after the respective interval of SIFS+Δi, thereby achieving synchronous multiple-frame transmission.

Figure 8:
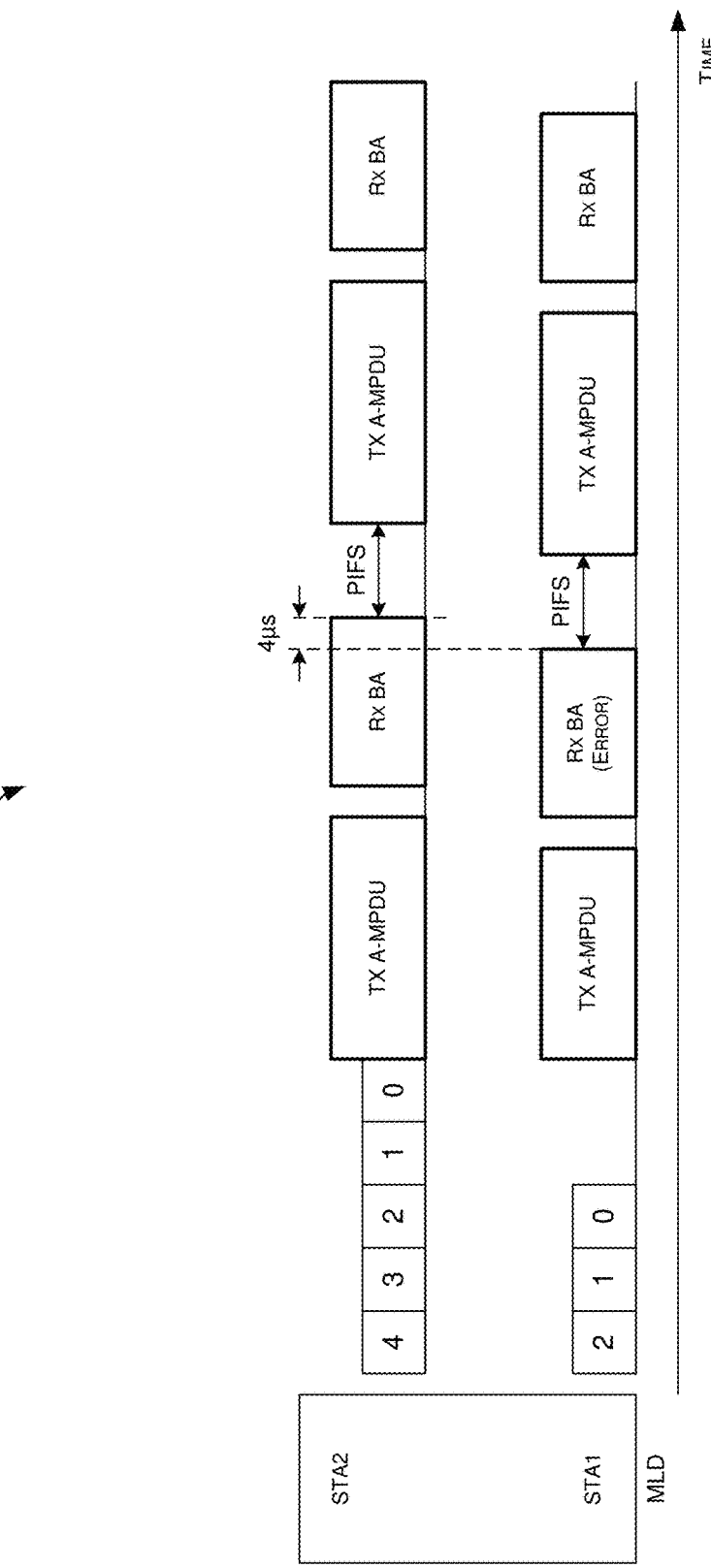
FIG. 8 is a diagram of an example scenario in accordance with an implementation of the present disclosure.

FIG. 8 illustrates an example scenario 800 with respect to error recovery in synchronous multiple-frame transmission under the proposed scheme. Referring to FIG. 8, in a third option (Option 3) under the proposed scheme, the maximum value of a difference between the ending times of physical-layer protocol data units (PPDUs) carrying an immediate response frame (e.g., ACK, BA or data (in case the PPDU is a trigger-based (TB) PPDU)) from a TXOP responder may be constrained to aRxTxTurnaroundTime, which is 4 μs. The TXOP holder may perform CCA during the PIFS interval without IDC interference.

In Option 3, the PPDU carrying a frame soliciting an immediate response may include a frame specifying the expected transmission time of the immediate response (e.g., ACK, BA or data if the PPDU is a TB PPDU). Thus, in case the TXOP holder intends to enable the PIFS recovery procedure after detection of a transmission failure, the TXOP holder may set the expected transmission time value of the immediate response to allow the ending time of the immediate response to be aligned within 4 μs.

Figure 9:
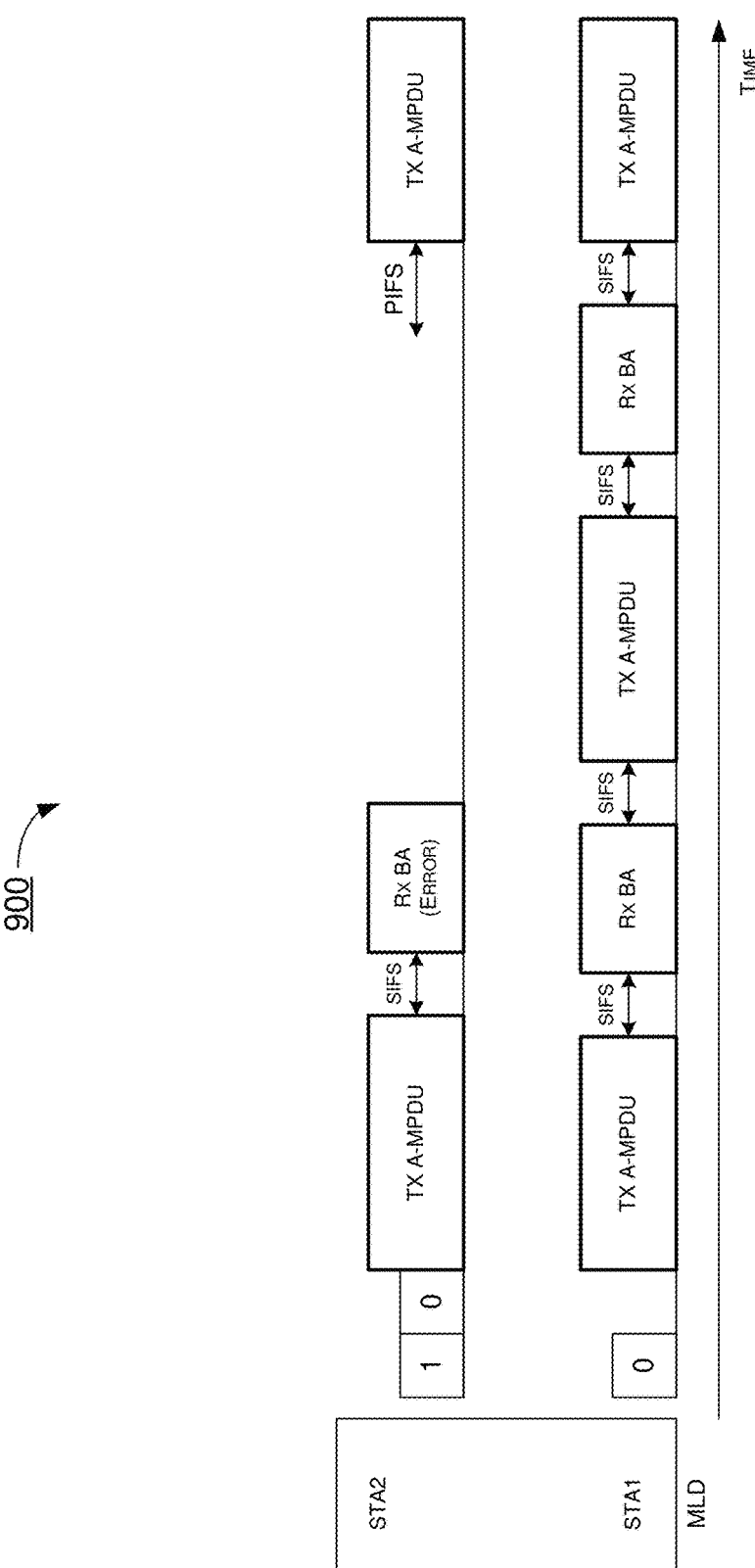
FIG. 9 is a diagram of an example scenario in accordance with an implementation of the present disclosure.
Figure 10:
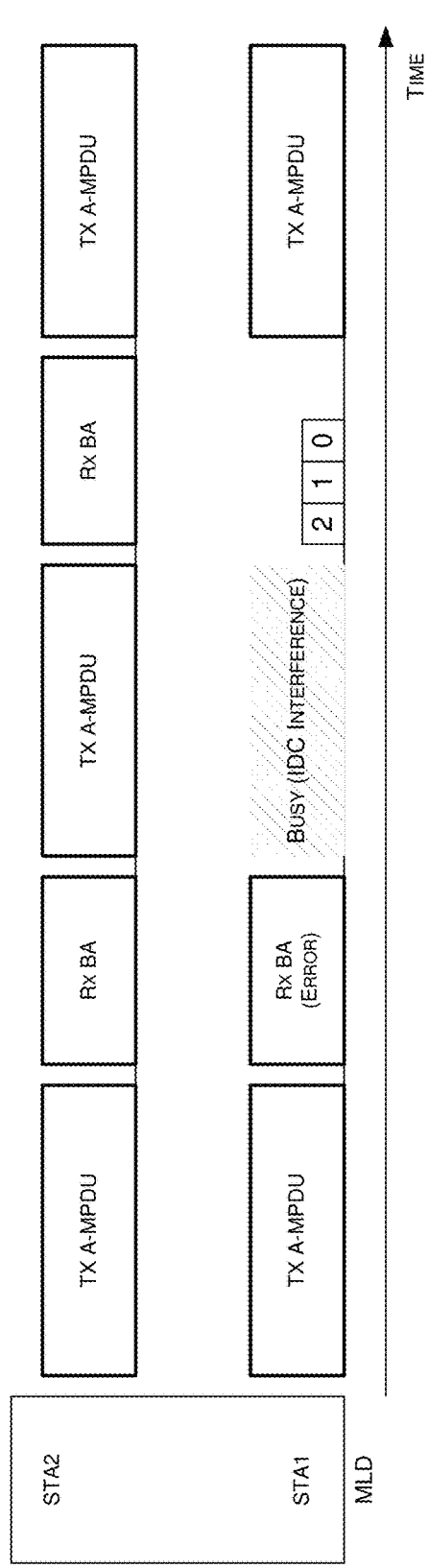
FIG. 10 is a diagram of an example scenario in accordance with an implementation of the present disclosure.

FIG. 9 illustrates an example scenario 900 with respect to error recovery in synchronous multiple-frame transmission under the proposed scheme. Referring to FIG. 9, in a fourth option (Option 4) under the proposed scheme, the error may not be recovered in an immediately-following frame because of IDC interference. However, during the TXOP, the error may be recovered in case the medium is still idle for the PIFS. FIG. 10 illustrates an example scenario 1000 under the proposed scheme. Referring to FIG. 10, when a transmission failure occurs, the STA may invoke a backoff procedure according to the baseline rule. In such case, the STA may not extend the TXNAV timer value. Moreover, the STA re-obtaining a channel access within an existing TXOP may synchronize a transmission through a synchronous channel access procedure, which is described below.

In Option 4, a STA that is affiliated with an MLD may follow a synchronous channel access procedure by first initiating a transmission on a link when the medium of that link is idle and at least one of a number of conditions is met. Such conditions include: (1) a backoff counter of the STA reaches zero on a slot boundary of that link, (2) the backoff counter of the STA is already zero, and the backoff counter of another STA of the affiliated MLD reaches zero on a slot boundary of the link that the other STA operates, and (3) the backoff counter of the STA is already zero and another STA of the affiliated MLD that is a TXOP holder transmits a non-initial PPDU. Then, when the backoff counter of the STA reaches zero, the STA may determine not to transmit and keep its backoff counter at zero. Next, in case the backoff counter of the STA has already reached zero, the STA may perform a new backoff procedure. The values of contention window for the access category (CW[AC]) and quantum series resonant converter for the access category (QSRC[AC]) may be left unchanged.

Figure 11:
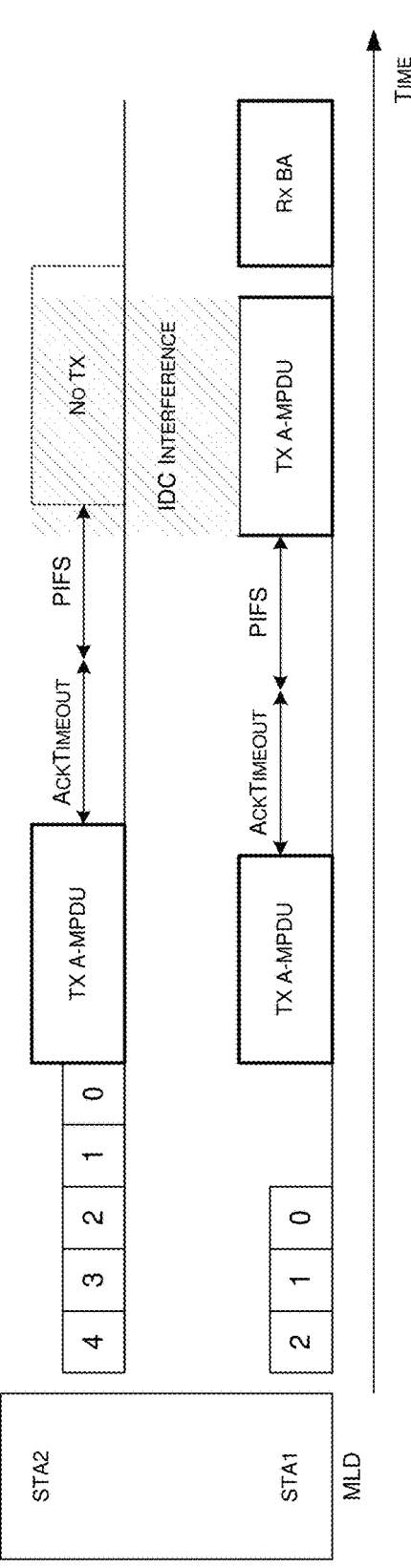
FIG. 11 is a diagram of an example scenario in accordance with an implementation of the present disclosure.

Under a proposed scheme in accordance with the present disclosure, when an MLD that is a TXOP holder does not receive any PHY-RXSTART.indication primitive from all STAs during an acknowledgement timeout (AckTimeout) interval, the MLD may perform the PIFS recovery procedure. Here, the AckTimeout interval may be equal to aSIFSTime+aSlotTime+aRxPHYStartDelay, and it may start at the PHY-TXEND.confirm primitive of a soliciting PPDU. However, in an event that the MLD is a non-STR MLD, when a transmission failure is detected at a different timing based on acknowledgement timeout (AckTimeout), during which no BA frame is received, the CS mechanism may indicate that the medium is busy at the TxPIFS slot boundary because of IDC interference caused by another STA in the same MLD. In such case, error cannot be recovered. FIG. 11 illustrates an example scenario 1100 in which error cannot be recovered.

Figure 12:
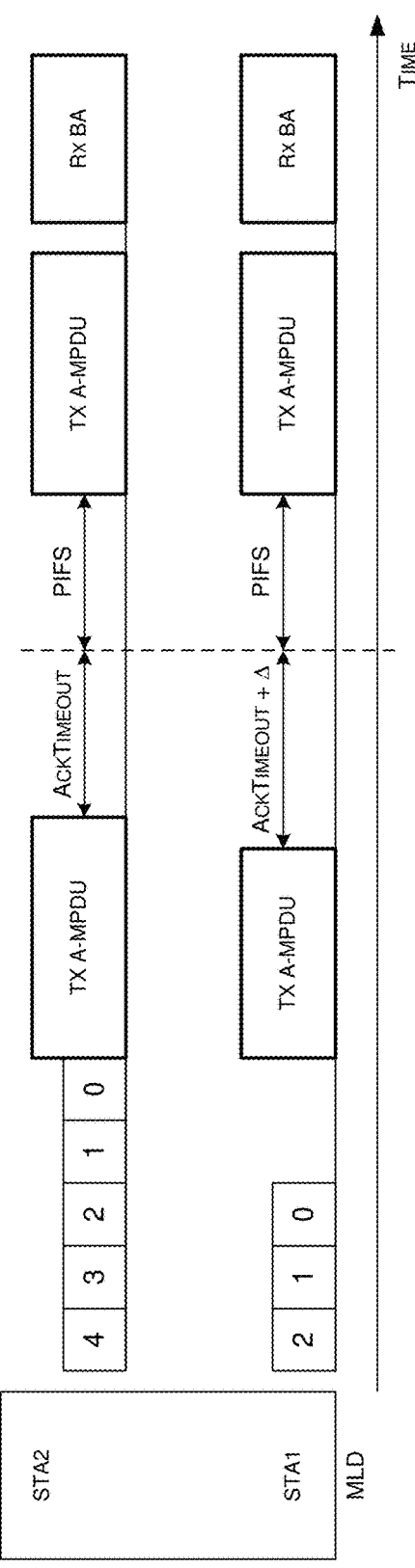
FIG. 12 is a diagram of an example scenario in accordance with an implementation of the present disclosure.

Under the proposed scheme, the AckTimeout may be synchronized across the STAs affiliated with the MLD. Assuming that the ending times of the soliciting PPDU are aligned within 8 μs ((aSIFSTime+aSignalExtension)/2), the AckTimeout of a STA may be set to a value from aSIFS-Time+aSlotTime+aRxPHYStartDelay to aSIFSTime+2× aSlotTime+aRxPHYStartDelay. In such case, aSlotTime may be 9 μs. Alternatively, depending on the implementation, the AckTimeout of the STA may be set to a value from aSIFSTime+aSlotTime+aRxPHYStartDelay to aSIFSTime+ aSlotTime+aRxPHYStartDelay+8 μs. FIG. 12 illustrates an example scenario 1200 under the proposed scheme. In general, the AckTimeout of STAs affiliated with the MLD may be adjusted to aSIFSTime+aSlotTime+aRxPHYStart-Delay+Δ, where Δ is a value up to aSlotTime or 8 μs. Alternatively, Δ may be added after the current fixed Ack-Timeout value (aSIFSTime+aSlotTime+aRxPHYStartDe-lay). In scenario 1200, Δ is a value up to aSlotTime or 8 μs.

Illustrative Implementations

Figure 13:
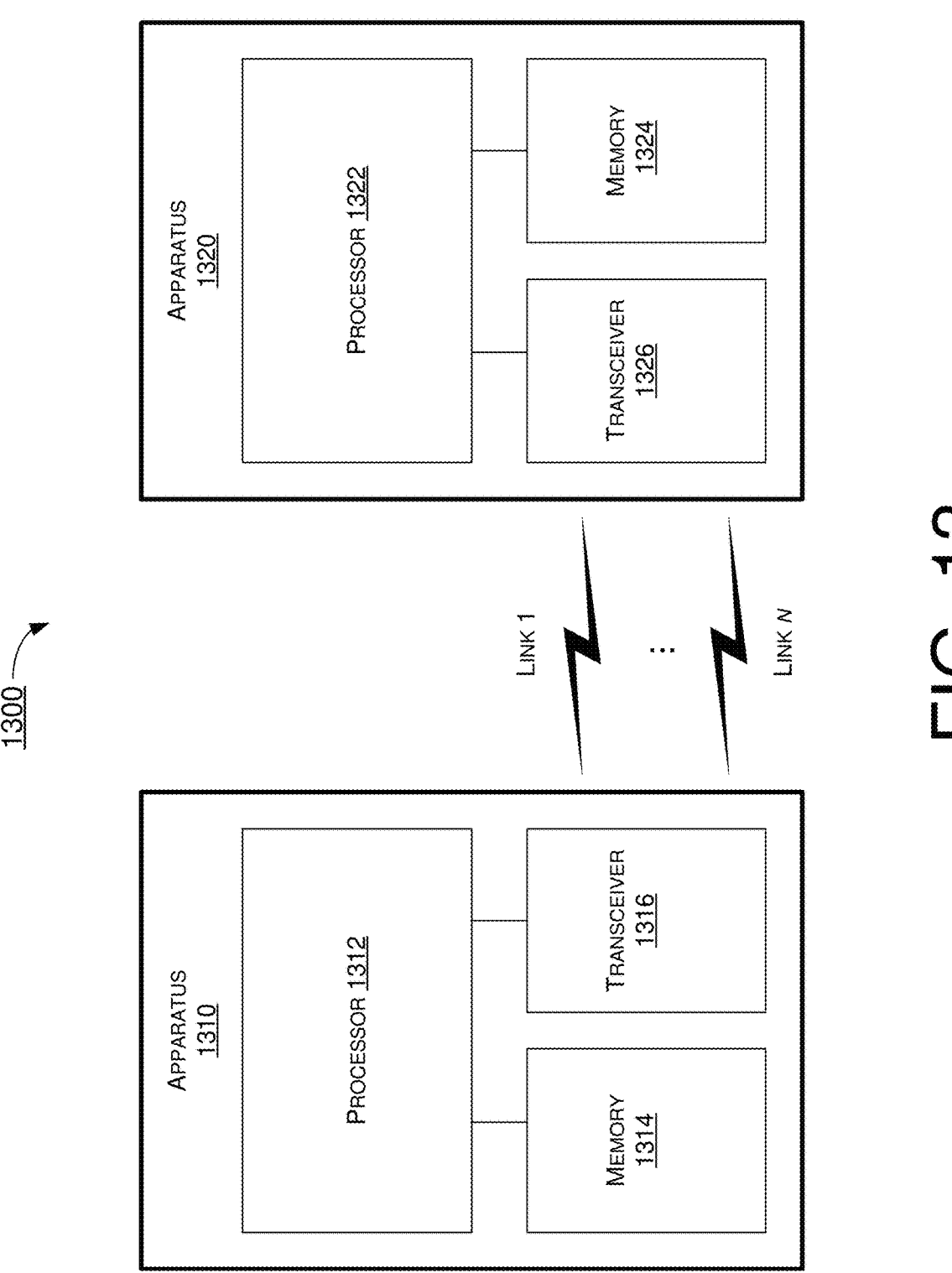
FIG. 13 is a block diagram of an example communication system in accordance with an implementation of the present disclosure.

FIG. 13 illustrates an example system 1300 having at least an example apparatus 1310 and an example apparatus 1320 in accordance with an implementation of the present disclo-sure. Each of apparatus 1310 and apparatus 1320 may perform various functions to implement schemes, techniques, processes and methods described herein pertaining to EHT error recovery in synchronous multiple-frame trans-mission in wireless communications, including the various schemes described above with respect to various proposed designs, concepts, schemes, systems and methods described above as well as processes described below. For instance, apparatus 1310 may be an example implementation of communication entity 110, and apparatus 1320 may be an example implementation of communication entity 120.

Each of apparatus 1310 and apparatus 1320 may be a part of an electronic apparatus, which may be a STA or an AP, such as a portable or mobile apparatus, a wearable appara-tus, a wireless communication apparatus or a computing apparatus. For instance, each of apparatus 1310 and appa-ratus 1320 may be implemented in a smartphone, a smart watch, a personal digital assistant, a digital camera, or a computing equipment such as a tablet computer, a laptop computer or a notebook computer. Each of apparatus 1310 and apparatus 1320 may also be a part of a machine type apparatus, which may be an IoT apparatus such as an immobile or a stationary apparatus, a home apparatus, a wire communication apparatus or a computing apparatus. For instance, each of apparatus 1310 and apparatus 1320 may be implemented in a smart thermostat, a smart fridge, a smart door lock, a wireless speaker or a home control center. When implemented in or as a network apparatus, apparatus 1310 and/or apparatus 1320 may be implemented in a network node, such as an AP in a WLAN.

In some implementations, each of apparatus 1310 and apparatus 1320 may be implemented in the form of one or more integrated-circuit (IC) chips such as, for example and without limitation, one or more single-core processors, one or more multi-core processors, one or more reduced-instruc-tion set computing (RISC) processors, or one or more complex-instruction-set-computing (CISC) processors. In the various schemes described above, each of apparatus 1310 and apparatus 1320 may be implemented in or as a STA or an AP. Each of apparatus 1310 and apparatus 1320 may include at least some of those components shown in FIG. 13 such as a processor 1312 and a processor 1322, respectively, for example. Each of apparatus 1310 and apparatus 1320 may further include one or more other components not pertinent to the proposed scheme of the present disclosure (e.g., internal power supply, display device and/or user interface device), and, thus, such com-ponent(s) of apparatus 1310 and apparatus 1320 are neither shown in FIG. 13 nor described below in the interest of simplicity and brevity.

In one aspect, each of processor 1312 and processor 1322 may be implemented in the form of one or more single-core processors, one or more multi-core processors, one or more RISC processors or one or more CISC processors. That is, even though a singular term "a processor" is used herein to refer to processor 1312 and processor 1322, each of proces-sor 1312 and processor 1322 may include multiple proces-sors in some implementations and a single processor in other implementations in accordance with the present disclosure. In another aspect, each of processor 1312 and processor 1322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some imple-mentations, each of processor 1312 and processor 1322 is a special-purpose machine specifically designed, arranged and configured to perform specific tasks including those pertaining to EHT error recovery in synchronous multiple-frame transmission in wireless communications in accordance with various implementations of the present disclosure.

In some implementations, apparatus 1310 may also include a transceiver 1316 coupled to processor 1312. Transceiver 1316 may be capable of wirelessly transmitting and receiving data. In some implementations, apparatus 1320 may also include a transceiver 1326 coupled to processor 1322. Transceiver 1326 may include a transceiver capable of wirelessly transmitting and receiving data. Transceiver 1316 of apparatus 1310 and transceiver 1326 of apparatus 1320 may communicate each other over one or more of multiple links link 1~link N, with N>1, such as a first link and a second link.

In some implementations, apparatus 1310 may further include a memory 1314 coupled to processor 1312 and capable of being accessed by processor 1312 and storing data therein. In some implementations, apparatus 1320 may further include a memory 1324 coupled to processor 1322 and capable of being accessed by processor 1322 and storing data therein. Each of memory 1314 and memory 1324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1314 and memory 1324 may include a type of read-only memory (ROM) such as mask ROM, programmable ROM (PROM), erasable programmable ROM (EPROM) and/or electrically erasable programmable ROM (EEPROM). Alternatively, or additionally, each of memory 1314 and memory 1324 may include a type of non-volatile random-access memory (NVRAM) such as flash memory, solid-state memory, ferroelectric RAM (FeRAM), magnetoresistive RAM (MRAM) and/or phase-change memory.

Each of apparatus 1310 and apparatus 1320 may be a communication entity capable of communicating with each other using various proposed schemes in accordance with the present disclosure. For illustrative purposes and without limitation, a description of capabilities of apparatus 1310, as communication entity 110 which may be a non-STR MLD, and apparatus 1320, as communication entity 120 which may or may not be a non-STR MLD, is provided below. It is noteworthy that, although the example implementations described below are provided in the context of WLAN, the same may be implemented in other types of networks.

Under a proposed scheme with respect to EHT error recovery in synchronous multiple-frame transmission in wireless communications in accordance with the present disclosure, processor 1312 of apparatus 1310 may detect, via transceiver 1316, a failure related to either or both of a first frame exchange sequence on a first link or a second frame exchange sequence on a second link that are performed by the MLD. Additionally, processor 1312 may adjust, via transceiver 1316, a timing of either or both of a first subsequent transmission on the first link and a second subsequent transmission on the second link to align the first and second subsequent transmissions by the MLD responsive to the detecting.

In some implementations, in adjusting the timing, processor 1312 may adjust a starting time of each of the first subsequent transmission on the first link and the second subsequent transmission on the second link such that the starting time of each of the first subsequent transmission and the second subsequent transmission is after an ending time of the first frame exchange sequence or the second frame exchange sequence by an time interval that is between a PIFS−4 μs and the PIFS, mathematically denoted as [PIFS−4 μs, PIFS].

In some implementations, in detecting the failure processor 1312 may detect the failure related to the second exchange sequence on the second link. In such cases, in adjusting the timing, processor 1312 may perform certain operations. For instance, processor 1312 may start the first subsequent transmission on the first link at a PIFS after an ending time of the first frame exchange sequence. Moreover, processor 1312 may start the second subsequent transmission on the second link at a SIFS plus delta after an ending time of the second frame exchange sequence, with the delta being between 0 μs and 8 μs.

In some implementations, in detecting the failure, processor 1312 may detect the failure related to the second exchange sequence on the second link. In such cases, in adjusting the timing, processor 1312 may perform certain operations. For instance, processor 1312 may start the first subsequent transmission on the first link at a PIFS after an ending time of the first frame exchange sequence with padding. Additionally, processor 1312 may start the second subsequent transmission on the second link at a SIFS plus a delta after an ending time of the second frame exchange sequence with padding, with the delta being between 0 μs and 8 μs.

In some implementations, in detecting the failure, processor 1312 may detect the failure related to the second exchange sequence on the second link. In such cases, in adjusting the timing, processor 1312 may perform certain operations. For instance, processor 1312 may start the first subsequent transmission on the first link at a SIFS plus a first delta after an ending time of the first frame exchange sequence with or without padding. Furthermore, processor 1312 may start the second subsequent transmission on the second link at the SIFS plus a second delta after an ending time of the second frame exchange sequence with or without padding, with each of the first delta and the second delta being between 0 μs and 8 μs.

In some implementations, in adjusting the timing, processor 1312 may adjust a starting time of each of the first subsequent transmission on the first link and the second subsequent transmission on the second link such that the starting time of each of the first subsequent transmission and the second subsequent transmission is after an ending time of the first frame exchange sequence on the first link or an ending time of the second frame exchange sequence on the second link by a PIFS. In some implementations, a difference between the ending time of the first frame exchange sequence and the ending time of the second frame exchange sequence may be up to 4 μs.

Under a proposed scheme with respect to EHT error recovery in synchronous multiple-frame transmission in wireless communications in accordance with the present disclosure, processor 1312 of apparatus 1310 may detect, via transceiver 1316, a timeout in reception of an acknowledgement related to either or both of a first transmission on a first link or a second transmission on a second link that are performed by the MLD. Moreover, processor 1312 may adjust, via transceiver 1316, a timing of either or both of a first subsequent transmission on the first link and a second subsequent transmission on the second link to align the first and second subsequent transmissions by the MLD responsive to the detecting.

In some implementations, in adjusting the timing, processor 1312 may perform certain operations. For instance, processor 1312 may start the first subsequent transmission on the first link at an acknowledgement timeout (AckTimeout) period plus a PIFS after an ending time of the first transmission. Alternatively, the AckTimeout may be adjusted to aSIFSTime+aSlotTime+aRxPHYStartDelay plus a delta, with the delta being between 0 µs and 8 µs. Moreover, processor 1312 may start the second subsequent transmission on the second link at the AckTimeout period plus a delta plus the PIFS after an ending time of the second transmission, with the delta being between 0 µs and 8 µs.

Illustrative Processes

FIG. 14 illustrates an example process 1400 in accordance with an implementation of the present disclosure. Process 1400 may represent an aspect of implementing various proposed designs, concepts, schemes, systems and methods described above. More specifically, process 1400 may represent an aspect of the proposed concepts and schemes pertaining to EHT error recovery in synchronous multiple-frame transmission in wireless communications in accordance with the present disclosure. Process 1400 may include one or more operations, actions, or functions as illustrated by one or more of blocks 1410 and 1420. Although illustrated as discrete blocks, various blocks of process 1400 may be divided into additional blocks, combined into fewer blocks, or eliminated, depending on the desired implementation. Moreover, the blocks/sub-blocks of process 1400 may be executed in the order shown in FIG. 14 or, alternatively in a different order. Furthermore, one or more of the blocks/sub-blocks of process 1400 may be executed repeatedly or iteratively. Process 1400 may be implemented by or in apparatus 1310 and apparatus 1320 as well as any variations thereof. Solely for illustrative purposes and without limiting the scope, process 1400 is described below in the context of apparatus 1310 implemented in or as communication entity 110 (e.g., an MLD) and apparatus 1320 implemented in or as communication entity 120 (e.g., a peer MLD) of a wireless network such as a WLAN in accordance with one or more of IEEE 802.11 standards. Process 1400 may begin at block 1410.

At 1410, process 1400 may involve processor 1312 of apparatus 1310 implemented in a communication entity 110 as a MLD detecting, via transceiver 1316, a failure related to either or both of a first frame exchange sequence on a first link or a second frame exchange sequence on a second link that are performed by the MLD. Process 1400 may proceed from 1410 to 1420.

At 1420, process 1400 may involve processor 1312 adjusting, via transceiver 1316, a timing of either or both of a first subsequent transmission on the first link and a second subsequent transmission on the second link to align the first and second subsequent transmissions by the MLD responsive to the detecting.

In some implementations, in adjusting the timing, process 1400 may involve processor 1312 adjusting a starting time of each of the first subsequent transmission on the first link and the second subsequent transmission on the second link such that the starting time of each of the first subsequent transmission and the second subsequent transmission is after an ending time of the first frame exchange sequence or the second frame exchange sequence by an time interval that is between a PIFS–4 µs and the PIFS, mathematically denoted as [PIFS–4 µs, PIFS].

In some implementations, in detecting the failure, process 1400 may involve processor 1312 detecting the failure related to the second exchange sequence on the second link. In such cases, in adjusting the timing, process 1400 may involve processor 1312 performing certain operations. For instance, process 1400 may involve processor 1312 starting the first subsequent transmission on the first link at a PIFS after an ending time of the first frame exchange sequence. Moreover, process 1400 may involve processor 1312 starting the second subsequent transmission on the second link at a SIFS plus delta after an ending time of the second frame exchange sequence, with the delta being between 0 µs and 8 µs.

In some implementations, in detecting the failure, process 1400 may involve processor 1312 detecting the failure related to the second exchange sequence on the second link. In such cases, in adjusting the timing, process 1400 may involve processor 1312 performing certain operations. For instance, process 1400 may involve processor 1312 starting the first subsequent transmission on the first link at a PIFS after an ending time of the first frame exchange sequence with padding. Additionally, process 1400 may involve processor 1312 starting the second subsequent transmission on the second link at a SIFS plus a delta after an ending time of the second frame exchange sequence with padding, with the delta being between 0 µs and 8 µs.

In some implementations, in detecting the failure, process 1400 may involve processor 1312 detecting the failure related to the second exchange sequence on the second link. In such cases, in adjusting the timing, process 1400 may involve processor 1312 performing certain operations. For instance, process 1400 may involve processor 1312 starting the first subsequent transmission on the first link at a SIFS plus a first delta after an ending time of the first frame exchange sequence with or without padding. Furthermore, process 1400 may involve processor 1312 starting the second subsequent transmission on the second link at the SIFS plus a second delta after an ending time of the second frame exchange sequence with or without padding, with each of the first delta and the second delta being between 0 µs and 8 µs.

In some implementations, in adjusting the timing, process 1400 may involve processor 1312 adjusting a starting time of each of the first subsequent transmission on the first link and the second subsequent transmission on the second link such that the starting time of each of the first subsequent transmission and the second subsequent transmission is after an ending time of the first frame exchange sequence on the first link or an ending time of the second frame exchange sequence on the second link by a PIFS. In some implementations, a difference between the ending time of the first frame exchange sequence and the ending time of the second frame exchange sequence may be up to 4 µs.

In some implementations, the MLD may be a non-STR MLD which cannot simultaneously transmit on one link and receive on another link of a plurality of links including the first link and the second link due to IDC interference.

FIG. 15 illustrates an example process 1500 in accordance with an implementation of the present disclosure. Process 1500 may represent an aspect of implementing various proposed designs, concepts, schemes, systems and methods described above. More specifically, process 1500 may represent an aspect of the proposed concepts and schemes pertaining to EHT error recovery in synchronous multiple-frame transmission in wireless communications in accordance with the present disclosure. Process 1500 may include one or more operations, actions, or functions as illustrated by one or more of blocks 1510 and 1520. Although illustrated as discrete blocks, various blocks of process 1500 may be divided into additional blocks, combined into fewer blocks, or eliminated, depending on the desired implementation. Moreover, the blocks/sub-blocks of process 1500 may be executed in the order shown in FIG. 15 or, alternatively in a different order. Furthermore, one or more of the blocks/sub-blocks of process 1500 may be executed repeatedly or iteratively. Process 1500 may be implemented by or in apparatus 1310 and apparatus 1320 as well as any variations thereof. Solely for illustrative purposes and without limiting the scope, process 1500 is described below in the context of apparatus 1310 implemented in or as communication entity 110 (e.g., an MLD) and apparatus 1320 implemented in or as communication entity 120 (e.g., a peer MLD) of a wireless network such as a WLAN in accordance with one or more of IEEE 802.11 standards. Process 1500 may begin at block 1510.

At 1510, process 1500 may involve processor 1312 of apparatus 1310 implemented in a communication entity 110 as a MLD detecting, via transceiver 1316, a timeout in reception of an acknowledgement related to either or both of a first transmission on a first link or a second transmission on a second link that are performed by the MLD. Process 1500 may proceed from 1510 to 1520.

At 1520, process 1500 may involve processor 1312 adjusting, via transceiver 1316, a timing of either or both of a first subsequent transmission on the first link and a second subsequent transmission on the second link to align the first and second subsequent transmissions by the MLD responsive to the detecting.

In some implementations, in adjusting the timing, process 1500 may involve processor 1312 performing certain operations. For instance, process 1500 may involve processor 1312 starting the first subsequent transmission on the first link at an acknowledgement timeout (AckTimeout) period plus a PIFS after an ending time of the first transmission. Alternatively, the AckTimeout may be adjusted to aSIFS-Time+aSlotTime+aRxPHYStartDelay plus a delta, with the delta being between 0 μs and 8 μs. Moreover, process 1500 may involve processor 1312 starting the second subsequent transmission on the second link at the AckTimeout period plus a delta plus the PIFS after an ending time of the second transmission, with the delta being between 0 μs and 8 μs.

In some implementations, the MLD may be a non-STR MLD which cannot simultaneously transmit on one link and receive on another link of a plurality of links including the first link and the second link due to IDC interference.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

detecting a failure related to a first frame exchange sequence on a first link or a second frame exchange sequence on a second link that are performed by a multi-link device (MLD); and adjusting a timing of at least one of a first subsequent transmission on the first link and a second subsequent transmission on the second link to align the first and second subsequent transmissions by the MLD responsive to the detecting, wherein the adjusting of the timing comprises performing one of a first procedure, a second procedure, a third procedure and a fourth procedure, wherein the first procedure comprises, responsive to detecting the failure related to the second exchange sequence on the second link:

starting the first subsequent transmission on the first link at a first point coordination function (PCF) inter-frame space (PIFS) after an ending time of the first frame exchange sequence; and starting the second subsequent transmission on the second link at a first short inter-frame space (SIFS) plus a delta after an ending time of the second frame exchange sequence, with the delta being between 0 μs and 8 μs, wherein the second procedure comprises, responsive to detecting the failure related to the second exchange sequence on the second link:

starting the first subsequent transmission on the first link at a second PIFS after the ending time of the first frame exchange sequence with padding; and starting the second subsequent transmission on the second link at a second SIFS plus the delta after the ending time of the second frame exchange sequence with padding, wherein the third procedure comprises, responsive to detecting the failure related to the second exchange sequence on the second link:

starting the first subsequent transmission on the first link at a third SIFS plus a first delta after the ending time of the first frame exchange sequence with or without padding; and starting the second subsequent transmission on the second link at the third SIFS plus a second delta after the ending time of the second frame exchange sequence with or without padding, with each of the first delta and the second delta being between 0 μs and 8 μs, and wherein the fourth procedure comprises, responsive to a difference between the ending time of the first frame exchange sequence and the ending time of the second frame exchange sequence being up to 4 μs, adjusting a starting time of each of the first subsequent transmission on the first link and the second subsequent transmission on the second link such that the starting time of each of the first subsequent transmission and the second subsequent transmission is after the ending time of the first frame exchange sequence on the first link or the ending time of the second frame exchange sequence on the second link by one PIFS.

2. The method of claim 1, wherein the MLD comprises a non-simultaneous-transmission-and-reception (non-STR) MLD which cannot simultaneously transmit on one link and receive on another link of a plurality of links including the first link and the second link due to in-device coexistence (IDC) interference.

3. An apparatus implementable in a multi-link device (MLD), comprising:

a transceiver configured to communicate wirelessly on a plurality of links including at least a first link and a second link; and a processor coupled to the transceiver and configured to perform operations comprising:

detecting, via the transceiver, a condition related to a first transmission on the first link or a second transmission on the second link; and adjusting, via the transceiver, a timing of at least one of a first subsequent transmission on the first link and a second subsequent transmission on the second link to align the first and second subsequent transmissions responsive to the detecting, wherein the adjusting of the timing comprises performing one of a first procedure, a second procedure, a third procedure and a fourth procedure, wherein the first procedure comprises, responsive to detecting the failure related to the second exchange sequence on the second link:

starting the first subsequent transmission on the first link at a first point coordination function (PCF) inter-frame space (PIFS) after an ending time of the first frame exchange sequence; and starting the second subsequent transmission on the second link at a first short inter-frame space (SIFS) plus a delta after an ending time of the second frame exchange sequence, with the delta being between 0 μs and 8 μs, wherein the second procedure comprises, responsive to detecting the failure related to the second exchange sequence on the second link:

starting the first subsequent transmission on the first link at a second PIFS after the ending time of the first frame exchange sequence with padding; and starting the second subsequent transmission on the second link at a second SIFS plus the delta after the ending time of the second frame exchange sequence with padding, wherein the third procedure comprises, responsive to detecting the failure related to the second exchange sequence on the second link:

starting the first subsequent transmission on the first link at a third SIFS plus a first delta after the ending time of the first frame exchange sequence with or without padding; and starting the second subsequent transmission on the second link at the third SIFS plus a second delta after the ending time of the second frame exchange sequence with or without padding, with each of the first delta and the second delta being between 0 μs and 8 μs, and wherein the fourth procedure comprises, responsive to a difference between the ending time of the first frame exchange sequence and the ending time of the second frame exchange sequence being up to 4 μs, adjusting a starting time of each of the first subsequent transmission on the first link and the second subsequent transmission on the second link such that the starting time of each of the first subsequent transmission and the second subsequent transmission is after the ending time of the first frame exchange sequence on the first link or the ending time of the second frame exchange sequence on the second link by one PIFS.

4. The apparatus of claim 3, wherein, in adjusting the timing, the processor further performs operations comprising:

starting the first subsequent transmission on the first link at an acknowledgement timeout (AckTimeout) period plus a point coordination function (PCF) inter-frame space (PIFS) after an ending time of the first transmission; and starting the second subsequent transmission on the second link at the AckTimeout period plus a delta plus the PIFS after an ending time of the second transmission, wherein the delta is between 0 μs and 8 μs.

5. The apparatus of claim 3, wherein the MLD comprises a non-simultaneous-transmission-and-reception (non-STR) MLD which cannot simultaneously transmit on one link and receive on another link of a plurality of links including the first link and the second link due to in-device coexistence (IDC) interference.

\* \* \* \* \*